INVENTOR
ALDO GNAVI
GIACOMO DI BARTOLOMEO

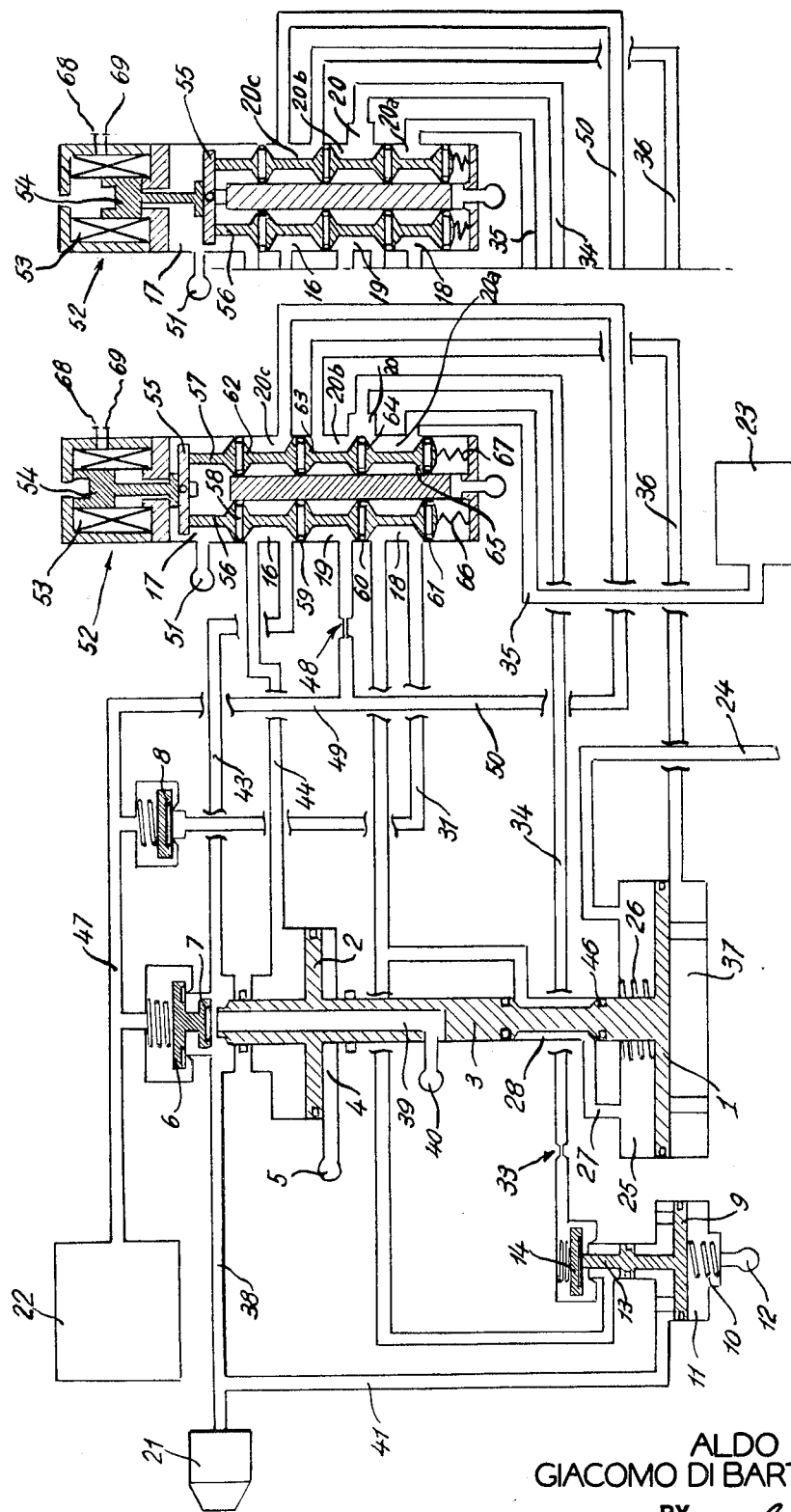

United States Patent Office 3,510,173
Patented May 5, 1970

3,510,173
RAILWAY BRAKE CONTROL APPARATUS WITH OPTIONAL GRADUATED OR DIRECT BRAKE RELEASE
Aldo Gnavi and Giacomo Di Bartolomeo, Turin, Italy, assignors to Compagnia Italiana Westinghouse Freni e Segnali, Turin, Italy
Filed June 10, 1968, Ser. No. 735,630
Claims priority, application Italy, June 21, 1967, 52,164/67
Int. Cl. B60t 15/52
U.S. Cl. 303—36    13 Claims

ABSTRACT OF THE DISCLOSURE

A railway car brake control valve device selectively conditionable to operate either as a direct release type brake control valve device or as a graduated release type brake control valve device whereby a railway car provided with this brake control valve device may be hauled in a freight train the cars of which are provided with direct release type brake control valve devices or in a passenger train the cars of which are provided with graduated release type brake control valve devices.

BACKGROUND OF THE INVENTION

The present invention refers to the equipment for the automatic fluid pressure brake where the supply and the release of fluid under pressure to and from a brake cylinder or cylinders of the equipment are controlled by a device which acts as a control valve and is operatively responsive to the pressure variations in the brake pipe.

The braking equipment with the above-mentioned characteristics, generally for railroad vehicles, and commonly referred to as distributors, or brake control valve devices, basically can be of two types.

In both of these types, the pressure of the brake cylinder obtained during the braking process, is a function of the pressure in the brake pipe, that is to say of the lowering or the reduction of pressure in the brake pipe.

On the other hand, these two types of distributors differ basically during the release process.

In the first type of brake release called direct release, in which case the distributor is commonly referred to as a triple valve, the release is caused by a pressure increase in the brake pipe, but the release of the brake cylinder thus initially started, continues until the cylinder itself is completely vented of fluid under pressure even if the above-mentioned pressure increase stops after reaching an established value sufficient to cause the distributor to return to the release position.

In order to block the release, with this type of distributor, it is, therefore, necessary to start again the braking process.

With this type of brake it is necessary, consequently while descending a grade, in order to adapt the braking pressure to the steepness of the grade to make use of cycle movements, that is to say of a succession of alternated brake applications with partial releases.

In brakes of this type the distribution of air is controlled by only two pressures (1) that of the brake pipe, and (2) that of the auxiliary reservoir destined to feed fluid under pressure to the brake cylinder during the brake application.

The shift to the braking position or to that of the release depends solely on the difference of the pressure established between the brake pipe and the auxiliary reservoir during the operation.

The pressure existing in the brake cylinder does not affect in any way the functioning of the distributor elements.

On the other hand, in the second type of distributor, called a graduated release type device, the release is not only caused by an increase in the pressure in the brake pipe, but it is a function of the pressure increase effected in the brake pipe.

More specifically, the present invention refers to this type of distributor, of the graduated release type, in which the degree of the release is controlled and the inexhaustibility of the brake obtained incidental to operation of the brake valve by the operator to effect the brake application and the subsequent release.

In the brakes of this type, the distribution of air is controlled by three pressures, namely (1) that in the brake pipe, (2) that in the reservoir having a constant pressure and called the control reservoir, and (3) that in the brake cylinder.

During the release, however, in the graduated release type of brake operation, the pressure in the auxiliary reservoir, destined to be supplied to the brake cylinder during the braking, acts so as to control the discharge of the brake cylinder according to the pressure existing in the auxiliary reservoir itself. With this arrangement an inexhaustible brake is obtained, as long as the reservoir with constant pressure does not suffer any losses.

While, as regards the safety factor, the brakes of this type are ideal for steep grades in that they provide for descending long and steep grades with complete safety and with relative facility of movement, they nevertheless offer a serious inconvenience for operation in level terrain in that they require considerable time for releasing a long train, because, due to the fact that the release of the brake cylinder varies accordingly as the auxiliary reservoir pressure is increased so that the slowness with which the auxiliary reservoirs are recharged on vehicles relatively distant from the locomotive is converted into a corresponding slowness of the release of fluid under pressure from the brake cylinders.

A considerable progress has been made in the last decades in speeding up the release process with this type of distributors. This is obtained by introducing various devices in combination with such apparatuses which can accelerate the rate of charging of the auxiliary reservoirs toward the end of the train, by means of a decrease in the supply of air from the brake pipe to the reservoirs at the front end of the train or through a possible prolonged release of the system at the pressure of the main reservoir without risking overcharging the control reservoirs for the first vehicles, with possible undesired braking or, in any case, difficulties in the release.

Nevertheless, the release times obtained in this manner for the rather long trains, even though they are considerably shorter than those obtained in the past with graduated release distributors of the same type, are still entirely longer than those which can be accomplished with the direct release distributors.

Moreover, it is to be noticed that while there is need for inexhaustibility on descending grades, it is much less needed on level terrain.

Therefore, it would be desirable to provide a type of brake which, while operating on the descending grades, would have characteristics of adjustability and inexhaustibility allowed by the graduated release distributors of the type mentioned above, and that while operating on level terrain would have the characteristics of the direct release distributors, which permit a rapid release as desired in order to speed up the operation.

If this type of brake control valve device is to be employed, some form of change-over means is necessary to condition the valve device according to the type of terrain over which the train travels, so that at the start of level track, a change-over may be effected from graduated to direct-release, and vice-versa at the start of a descending grade.

A change-over operation for similar purposes is now being used on the railway systems which still use direct release distributors, in order to introduce two different systems for the release of the brake cylinder, called "Pianura-Montagna" (Level ground-Uphill) which differ in respect of the rate of the discharge allowed by the exhaust calibrated opening; in this case, in the "Montagna" system, the inexhaustibility of the brake is approximated in that the brake cylinder release is slowed-down to allow the auxiliary reservoirs on the vehicles farthest from the locomotive to recharge completely after a full braking, during the release operation after a full brake application while the brake cylinders are completely vented.

Naturally, the use of a similar system, namely of a direct release distributor, but with two release systems for the brake cylinder, rapid or slow, requires that the operator when descending a grade, always use cycle movements, namely an alternated succession of braking and partial releases, because it is impossible to adjust the releases to a desired level.

Therefore, it would be preferable to employ a distributor of the type previously mentioned, with the possibility of change-over of the characteristics from the graduated release operation while descending grades, to the direct release operation while traveling on level track.

This type of distributor introduced in the past, basically consisted of a distributor with direct release, which carried out by itself the braking function and only the start of the release, in that the exhaust of the brake cylinder, open when the handle of the change-over cock was in the "direct release" position, was instead controlled, when this handle was in the "graduated release" position, by a second section or graduated release valve where, as in the graduated release distributors, this release was connected with the recharge of the auxiliary reservoir with the constant parameter set up by the pressure in a control reservoir.

A distributor of this type is nonetheless complex because it is made up of two basically separated sections, one of which provides for a complete release upon the start of the release, while the other one, which provides for graduated release, involves the use of most of the elements which characterize a distributor complete with the graduated release feature.

SUMMARY OF THE INVENTION

The present invention instead provides a distributor, with a relatively simple make-up, capable of accomplishing selectively by means of a change-over valve device, the characteristics of the graduated release or of the direct release, but basically using the make-up of the graduated release distributors with relative functions when the apparatus is arranged for this type of release, and using the same make-up while substituting certain pressures in the various compartments, when the apparatus is arranged for the "direct release."

Naturally, the change-over movement from the "graduated release" system to that of "direct release" can be done manually, but in order to obviate the necessity of the trained personnel trained for manually effecting this operation of the change-over valve on each car, the change-over can also be controlled by the operator himself with an appropriate device, for instance electrically operated change-over means.

It must be kept in mind, for this purpose, that the use of electrical wires extending through the train, necessary for this control, may be easily provided in the equipment for the present automatic brake, where the connection between the vehicles is only pneumatic, by providing an electrical connection between each vehicle through connectors, which in the future may take the form of the automatic coupler anticipated in Europe, providing in addition to the automatic car coupling, also the pneumatic and electrical coupling. This last form of coupler is in anticipation of the eventual use of an electropneumatic brake.

The change-over of the systems from the "graduated release" to the "direct release" controlled by the operator can be carried out as well with purely pneumatic means; for instance, with a system of normally charged pressure in the brake pipe, by subjecting the same to a certain degree of vacuum.

The invention is described below and explained by reference to the attached drawings, in which:

FIG. 3 shows a modified form of the device in the position for graduated release operation.

FIG. 4 shows the device shown in FIG. 3 in the position for direct release operation.

Figures 1, 2:
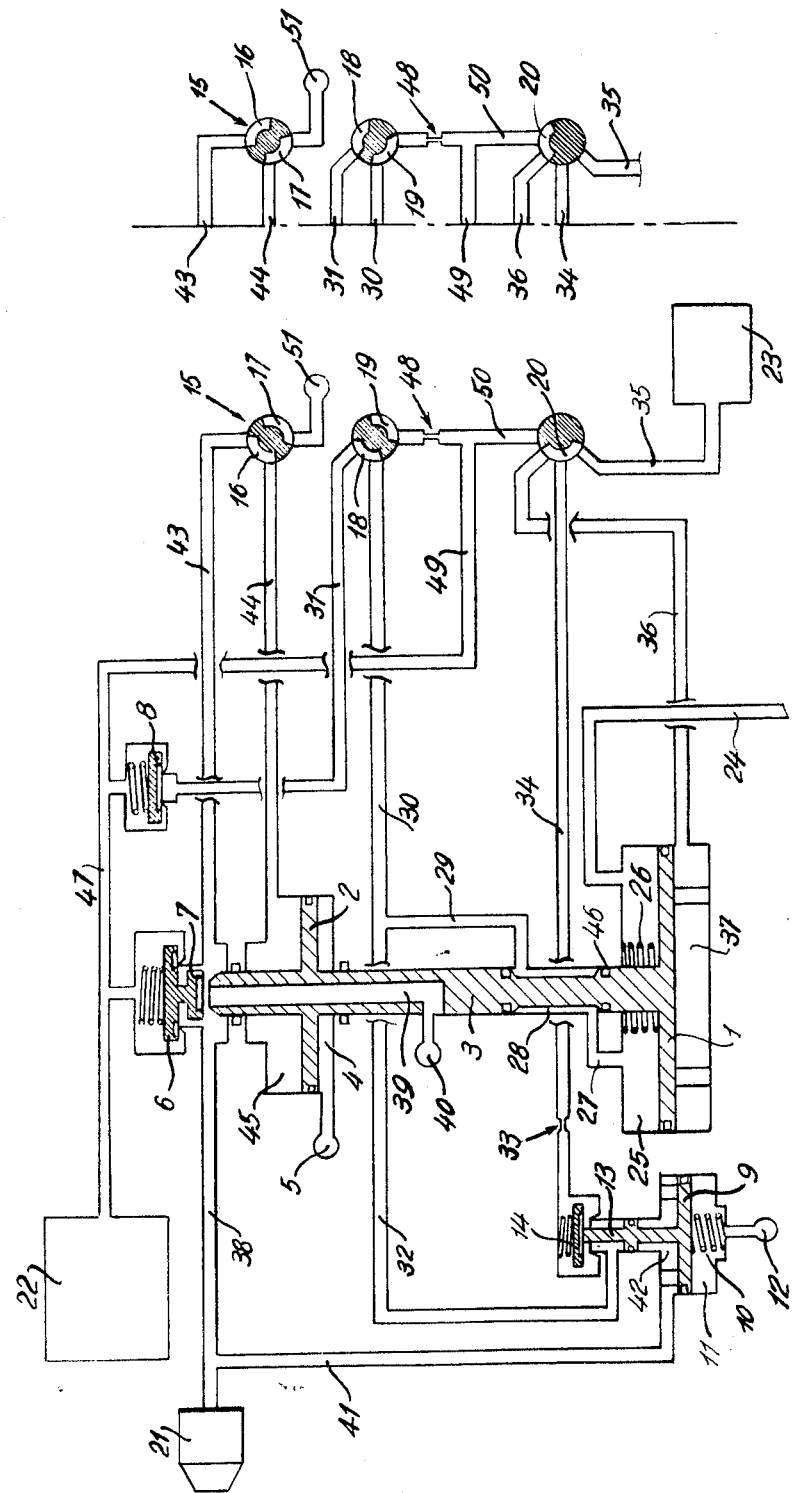
FIG. 1 shows schematically in section a form of the device which is the object of the invention, applied to a fundamental type of brake control valve device to provide for the direct or the graduated release of brakes, and shown in the position for graduated release operation.
FIG. 2 shows the same device in the position for direct release operation.

With reference to FIG. 1, it is observed that the brake control valve device is made up in the central part of a service valve device, in the lateral part to the left, with a charging valve device for the control reservoir, and in the lateral part to the right, with a change-over valve device for changing the brake control valve device from graduated release operation to that of direct release operation.

In the main device are found: (1) at the center, the motor piston 1 and the balancing piston 2, in which the seal is provided by rubber O-rings thereby assuring air-tight elements, and a valve stem 3 which transmits the pressure between the two pistons. Compartment 4 under the balancing piston 2 is constantly open to atmosphere by means of exhaust passageway 5; and (2) at the top, the supply and exhaust valves 6–7 for the brake cylinder, and the charging valve 8 of the auxiliary reservoir.

In the charging control valve device of the control reservoir are found the operating piston 9 under which acts a spring 10 in a chamber 11 which is open to atmosphere by means of an exhaust passageway 12, the valve operating stem 13 and the charging valve 14 for the control reservoir.

The change-over valve device for providing "graduated release-direct release" systems is made up of a cock plug 15 which can assume two positions, and which can establish certain communications between the various compartments, through cavities 16, 17, 18, 19 and 20 provided in this plug.

The brake control valve device is connected to the following outside compartments, namely, brake cylinder device 21, auxiliary reservoir 22, and control reservoir 23.

With reference to FIG. 1, the operation of the equipment, in which the device for the change-over of the systems is in the position for graduated release operation, is as follows:

In a charging position, which is the one shown in the drawing, the compressed air which comes from the brake pipe flows to the brake control valve device through passage 24. Upon reaching chamber 25 above motor piston 1, this air under pressure pushes it to its extreme low position shown in the drawing, with the aid of the light spring 26.

From chamber 25 the compressed air from the brake pipe flows through passageway 27 and groove 28 in valve stem 3, to passageway 29. From here, it flows through passageway 30, groove 18 in the change-over cock plug 15, and passageway 31, to the check valve 8, raising it and thus charging the auxiliary reservoir 22.

At the same time, compressed air in the passageway 29 supplied thereto from the brake pipe also, flows through passageway 32, to the lower side of charging valve 14 of the charging control valve device of the control reservoir, which valve 14 is normally opened by the piston 9, which is moved to its upper position as shown in the drawing, by means of the light spring 10.

After flowing past open valve 14 the above-mentioned air charges the control reservoir 23 through the choke 33, passageway 34, groove 20 in the change-over cock plug 15 and passageway 35. This air also flows through passageway 36 to chamber 37 under motor piston 1 of the service valve device.

Brake cylinder device 21 is shown in communication with atmosphere through passageway 38, passageway 39 in valve stem 3 of the balancing piston 2 and exhaust passageway 40. Brake cylinder device 21 is also in communication through passageway 41 with chamber 42 above piston 9 of the charging control device of the control reservoir 23.

The brake cylinder 21 is also connected through passageway 43, groove 16 in the change-over cock plug 15, and passage 44, with chamber 45 above balancing piston 2.

When the system is fully charged to the normal pressure of the brake pipe, motor piston 1 is balanced between the pressures in compartments 25 and 37 above and below the same, which are respectively connected to the brake pipe and to the control reservoir 23.

As soon as the operator starts the brake application by causing a reduction of pressure in the brake pipe, the air in the control reservoir and in chamber 37 under the motor piston flows back into the brake pipe through passageways 36 and 34, the choke 33, past valve 14 now open, passageways 32 and 29, groove 28, passageway 27, chamber 25 and passageway 24, but the difference in pressure caused between chambers 37 and 25 by throttle or choke 33, cause the lifting of piston 1 to the top.

In its shifting to the top the motor piston raises also the balancing piston 2 through the valve stem 3, thereby closing communication between brake cylinder 21 and the atmosphere when the upper end of valve stem 3 rests against exhaust valve 7.

At the same time, communication is interrupted between the control reservoir 23 and the brake pipe in that, by lifting valve stem 3 the packing or O-ring 46 on the valve stem interrupts the communication normally established by groove 28 on the valve stem itself between the passageways 29 and 32 and passageway 27 which opens into the motor chamber 25.

The further lifting of the pistons 1 and 2 and valve stem 3 then opens supply valve 6, whereupon the compressed air in the auxiliary reservoir 22 flows into brake cylinder 21 through passageway 47, past the above-mentioned supply valve 6 and passageway 38. Simultaneously, the pressure in the brake cylinder is also established in chamber 45 above balancing piston 2, through passage 43, groove 16 in the change-over cock plug 15 and passageway 44.

As soon as the pressure of the brake cylinder has reached an established level, very low, for instance 0.25 kg./cm.$^2$, piston 9 of the charging control valve device for the control reservoir 23 is lowered, moving valve operating stem 13 with it to allow a spring to close the check valve 14, isolating thus definitely control reservoir 23 and chamber 37 under motor piston 1 from the brake pipe. The pressure in these compartments remains therefore substantially at the level of the pressure in the system.

When the pressure in the brake cylinder 21 which acts on the balancing piston 2 has reached the level corresponding to the reduction of pressure effected in the brake pipe, and therefore in chamber 25 above motor piston 1, the valve stem 3 and the two pistons 1 and 2 are lowered again so as to cause the closing of intake valve 6 to cut off the supply of air to the brake cylinder 21, without opening the exhaust valve 7 and passageway 39, thus assuming the lap position.

Upon decreasing the pressure in the brake pipe, the pistons 1 and 2 and valve stem 3 are raised again, reopening supply valve 6 and thus supplying further air to the brake cylinder 21 until the pressure in this cylinder is increased to a pressure in accordance with the decreased pressure in the brake pipe.

This is continued until the maximum pressure is reached in the brake cylinder at which time the pressure in the auxiliary tank reservoir 27 and in the brake cylinder 21 are equalized.

If a loss is registered in the pressure of the brake cylinder 21, the pressure in chamber 45 decreases, and thus the balance of the pistons 1 and 2 is upset, which, therefore, causes these pistons to raise again to the braking position until the pressure is reestablished, in the brake cylinder, and the pistons 1 and 2 and stem 3 return to their lap position.

When the operator increases the pressure in the brake pipe and, therefore, in chamber 25, the balance of the pistons 1 and 2 and stem 3 of the service valve device is disrupted and these pistons and stem are lowered from the lap position to the brake releasing position.

The air in the brake cylinder 21 then escapes, therefore, to the atmosphere through passageway 39 in the valve stem 3 and balancing piston 2, and exhaust passageway 40.

When the pressure in the brake cylinder 21, acting in chamber 45 on balancing piston 2, is lowered to a level so as to balance the increased pressure in the brake pipe extisting in chamber 25, the pistons 1 and 2 and stem 3 are raised again to reclose the exhaust valve 7.

During the release procedure, the down stroke of valve stem 3 of the service valve device to the release position permits packing 46 to reopen the communication between groove 28 on this valve stem 3 and passageway 27 which opens into chamber 25.

The air coming from the brake pipe to the chamber 25 can then flow to the auxiliary reservoir 22 through passageway 27, groove 28, passageways 29 and 30, groove 18, passageway 31 and check valve 8.

When the pressure in the brake cylinder 21, and acting in chamber 42, of the charging control valve device for the control reservoir 23 is lowered to the closing value of valve 14, previously set at 0.25 kg./cm.$^2$, piston 9 of the above-mentioned charging control valve device is pushed up again by spring 10, thus causing the reopening of valve 14 and, therefore, reestablishing a communication between the control reservoir 23 and the brake pipe.

With regard now to FIG. 2, in which the change-over cock of the system is shown in the position for direct release operation of the brake control valve device, the operation of the apparatus differs substantially from that described above in that:

The constant pressure of the control reservoir 23 is eliminated as the force which governs the supply of the air to the brake cylinder 21.

The pressure of the brake cylinder 21 also is eliminated by the force of brake cylinder pressure disappearing from chamber 45 on top of balancing piston 2.

The pressure of the control reservoir in chamber 37, which corresponds to the pressure of the brake pipe "existing" in the motor chamber 25, above motor piston 1, is substituted by the pressure from auxiliary reservoir 22, the two pressures being the only ones necessary to control the functioning of the apparatus, identical to the classic triple valve.

The functioning of the apparatus is as follows:

With the brake control valve device in a recharging position, which is that shown in the drawing, the compressed air comes from the brake pipe through passage 24, to chamber 25, and from here through passageway 27, groove 28 and passageway 29 to passageway 30, and from there through groove 19 (FIG. 2) in the change-over cock plug, the choke 48, and passageways 49 and 47, to auxiliary reservoir 22.

Simultaneously the pressure in the auxiliary reservoir 22 also flows through choke 48 to chamber 37 under motor piston 1 through passageway 50, groove 20 in the change-over cock plug 15, and passageway 36.

Control reservoir 23 is now isolated permanently by the change-over cock plug 15 which intercepts each communication from passageway 35; and this interrupts also the communication between the charging control valve device and the control reservoir through passageway 34.

The communication between brake cylinder 21 and chamber 45 above the balancing piston 2 through passage 43, groove 16 and passageway 44 is closed and chamber 45 is open to the atmosphere through passageway 44, groove 17 of the above-mentioned change-over cock plug 15 and exhaust passageway 51.

The brake cylinder 21 is in communication with the atmosphere through passageway 38, passage 39 in the valve stem 3 of balancing piston 2 and exhaust passageway 40.

When the system is charged completely to the normal operating pressure in the brake pipe, piston motor 1 is in balance between the pressures in compartments 25 and 37 above and below the same, that is to say by the respective pressures in the brake pipe and in the auxiliary reservoir.

When the operator begins a brake application by causing a reduction in the pressure in the brake pipe, the air from the auxiliary reservoir and from chamber 37 under the motor piston tends to reflow to the brake pipe through passageway 49, choke 48, groove 19 (FIG. 2) in the change-over cock plug 15, passageways 30 and 29, groove 28, passageway 27, chamber 25 and passageway 24, but the difference in pressure which is created between chambers 37 and 25, as a result of the choke 48, causes the raising of motor piston 1 to the up position.

In shifting to the up position, the motor piston raises with it the balancing piston 2 and the valve stem shaft 3, closing the communication between brake cylinder 21 and the atmosphere, when the piston pushes itself against exhaust valve 7.

At the same time the communication between the auxiliary reservoir 22 and the brake pipe becomes interrupted, in such a way that by raising valve stem 3, the communication between groove 28 on the valve stem 3 and passage 27 which opens into motor chamber 25 becomes interrupted by "packing" 46 on the shaft.

The last raising of the equipment has then the effect of opening supply valve 6, through which the compressed air from auxiliary reservoir 22 flows to brake cylinder 21 through passageway 47, the above-mentioned supply valve 6 and passageway 38.

As soon as the pressure in the auxiliary reservoir and existing in chamber 37 under motor piston 1, as a result of flow of air from the auxiliary reservoir to brake cylinder, is lowered to a value substantially identical or slightly less than that in the brake pipe and acting on the upperside of piston 1; these two pistons 1 and 2 will lower themselves again until they cause the closing of supply valve 6 and thereby interrupt the supply of air to the brake cylinder, without, however, opening the exhaust through exhaust valve 7, assuming thus the lap position.

By decreasing the pressure in the brake pipe, the pistons 1 and 2 will raise again, reopening supply valve 6 and thus finally supplying air to the brake cylinder 21 until the pressure in the auxiliary reservoir 22 is lowered to a value slightly less than that in the brake pipe.

This operation may be repeated until maximum brake cylinder pressure is obtained when the pressures in the auxiliary reservoir 22 and the brake cylinder 21 will be equalized.

When the operator increases the pressure in the brake pipe and, therefore, in chamber 25 above motor piston 1, the balance on the piston 1 is broken between the pressure of the brake pipe acting above this piston and that of the auxiliary reservoir 22 acting in the chamber 37 under the piston. Consequently, piston 1 drops from the lap position to the release position, whereupon the air from the brake cylinder 21 escapes, therefore, to the atmosphere through passage 39 in the valve stem 3 and balancing piston 2 and exhaust passageway 40.

It should be noted that the release proceeds until the complete exhaust of the brake cylinder is obtained even if there is a subsequent rise in the pressure in the brake pipe.

When the pistons 1 and 2 and valve stem 3, at the initial release stage, drops from the lap position to the release position, packing 46 on valve stem 3 above piston motor 1, reopens the communication between the brake pipe and the auxiliary reservoir 22 through motor chamber 25, passageway 27, groove 28, passageways 29 and 30, groove 19 of change-over cock plug 15, choke 48 and passageways 49 and 47, thus permitting the recharging of the auxiliary reservoir 22 from the brake pipe to the normal pressure carried therein.

With reference now to the modified form to be carried out in accordance with the present invention, shown in FIG. 3, it is noticed that it differs from that shown in FIGS. 1 and 2 only by the fact that the change-over from the graduated release operation to that of direct release is controlled, rather than manually by a cock, by a device operated electrically by the operator and that it accomplishes the same communications of the cock under manual control, in accordance with the current intake or at least in the relative control lines.

With reference to FIG. 3, in which is shown a brake control valve device designed for graduated release operation, it is shown that this valve device, in the central part and in the lateral part on the left, is totally identical to that described in FIG. 1.

In the lateral part to the right, however, instead of a change-over cock, a device is shown which is controlled by an electric switch and which can accomplish the same communications between the various compartments as carried out by this cock.

This electric change-over device is made up of: one electromagnet 52 comprising a winding 53 which actuates a plunger 54 which controls, by means of a piston 55, two spool-type valves 56 and 57 equipped with small pistons 58, 59, 60, 61, 62, 63, 64 and 65. These spool-type valves are normally raised to an extreme upper position shown in the drawing, by a pair of springs 66 and 67.

With reference to FIG. 3, the operation of the brake control valve device, in which, as stated above, the change-over valve device for the system is in the graduated release position, is as follows.

While winding 53 of electromagnet 52, which may be supplied with current via wires 68 and 69, is deenergized, armature plunger 54 is moved to a raised position shown on the drawing, together with piston 55 and spool-type valves 56 and 57, by the action of two springs 66 and 67 acting on the respective lower ends of these valves.

The operation of this brake control valve device is identical to that described with reference to FIG. 1, except that the communication between the various compartments rather than being determined by grooves 20, 19, 18, 16 and 17 in the plug of the change-over cock, are accomplished by the cavities or lands denoted by the same reference numerals on the spool-type valves 56 and 57, between the individual small spaced-apart pistons on these valves.

One can observe that the function explained above for groove 20 in the change-over cock plug 15 activated manually in FIGS. 1 and 2 is now performed by groove 20 to which pasageway 34 is connected and grooves 20a and 20b to which passageways 35 and 36 are connected.

With reference to FIG. 4, the operation of the brake control valve device when the change-over valve device for the system is in the position for direct release operation is as follows.

Winding 53 of electromagnet 52 is energized via wires 68 and 69, causing a lowering of armature plunger 54, and, therefore, of piston 55 as well as spool-type valves 56 and 57, to the extreme low position shown in the drawing.

The operation of the brake control valve device is now identical to that described in FIG. 2, except that, as in the case of FIG. 1, communications through the various compartments rather than being determined by grooves 20, 19, 18, 16 and 17, in the plug of the change-over cock, are accomplished with similar cavities or lands between the spaced-apart pistons of spool-type valves 56 and 57.

In this case, referring to the function of groove 20 in change-over plug 15 operated manually, FIG. 2, it is now performed by cavity 20c, which, as shown in FIG. 4, establishes a communication between passageways 36 and 50.

Figures 5, 6:
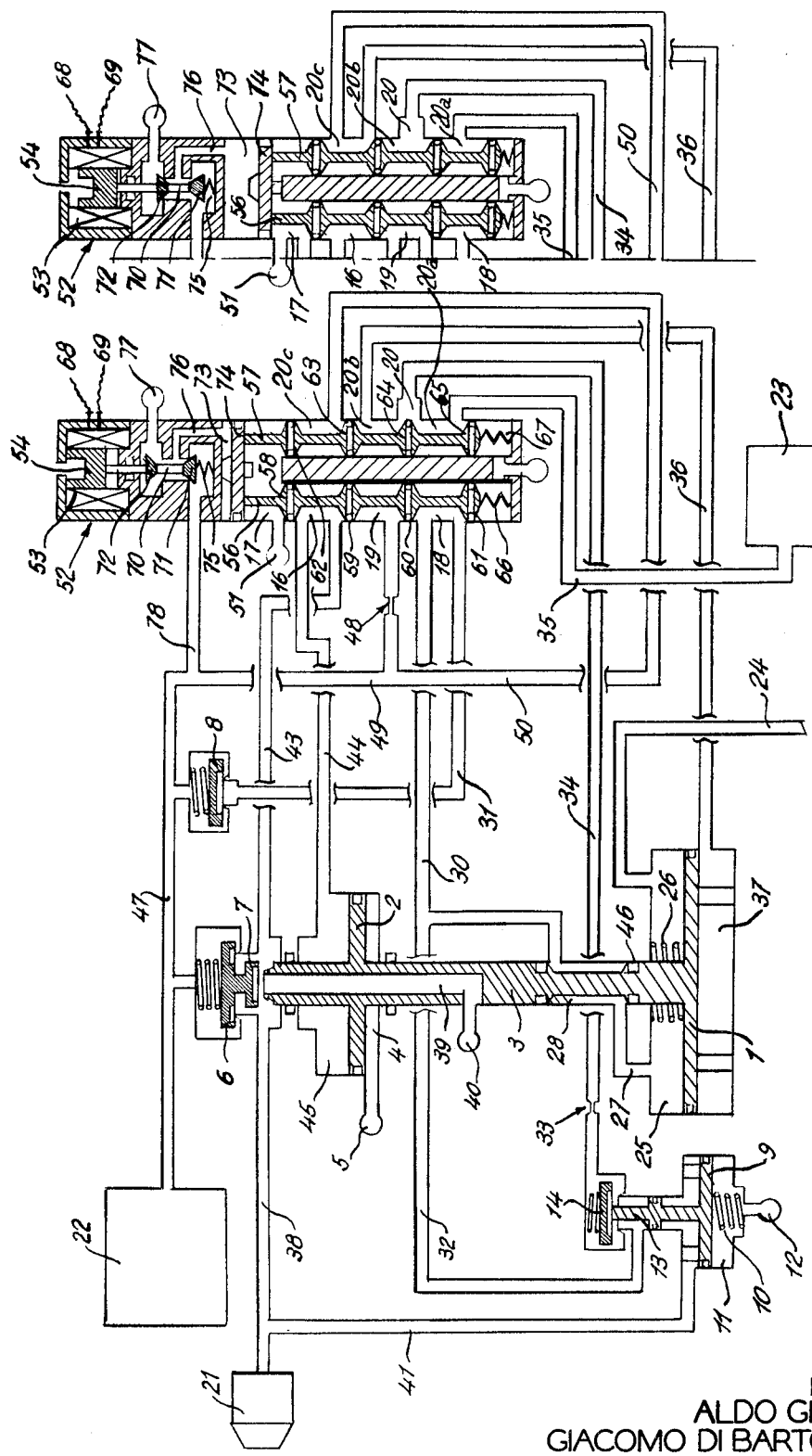
FIG. 5 shows a further modified form of the device in the position for graduated release operation.
FIG. 6 shows the device shown in FIG. 5 in the position for direct release operation.

With reference now to the modified form for carrying out the present invention represented in FIG. 5, one notes that this brake control valve device, like the valve device shown in FIGS. 3 and 4, is provided with an electrical control for operating the change-over valve device from the position for effecting graduated release operation to the position for effecting direct release operation. However, it differs in the fact that this control is not accomplished electromagnetically with direct action of a solenoid on the spool-type valves.

With reference to FIG. 5, in which the brake control valve device is shown in the position for graduated release operation, this brake control valve device is again identical in the central part and in the left lateral part, to that shown in FIGS. 1 and 3.

In the right lateral part, however, the change-over valve device with electromagnetic control, still accomplishes by means of spool-type valves, the identical communications between the various compartments carried out in the brake control valve device shown in FIGS. 3 and 4, with the difference being that these spool-type valves are operated pneumatically by a piston supplied with air from an electromagnetic valve rather than by a piston activated mechanically by an electromagnet.

This electric change-over device, therfore, consists of: one electro-pneumatic valve 52 comprising one winding 53 which activates plunger 54 which controls one rigid valve stem 70 with one supply valve 71 and with one exhaust valve 72 at its respective opposite ends, which controls the supply of fluid under pressure to and the release thereof from a chamber 73 above a piston 74 which controls the position of spool-type valves 56 and 57.

With reference to FIG. 5 the operation of the brake control valve device, in which, as is mentioned above, the change-over valve device is positioned for graduated release operation, is as follows.

While winding 53 of electromagnet 52, which may be supplied with current via wires 68 and 69, is deenergized, armature plunger 54 is moved to a raised position shown in the drawing, together with the solid valve stem 70 to the opposite end of which are connected exhaust valve 72 and supply valve 71, by the action of a light spring 75 acting under the supply valve 71.

In this condition, supply valve 71 is closed and exhaust valve 72 is, on the other hand, open.

Chamber 73 above piston 74 is, therefore, open to the atmosphere through passageway 76, past exhaust valve 72 and exhaust passageway 77, thus permitting the piston 74 to remain in a raised position shown in the drawing together with the spool-type valves 56 and 57, by the action of two springs 66 and 67 acting respectively on the lower end of these valves.

The functioning of the unit is thus analogous to that described in FIG. 3, in which the spool-type valves were controlled by piston 55 activated directly by armature plunger 54 of the electromagnet.

With reference to FIG. 6, the operation of the brake control valve device while the change-over valve device is positioned for direct release operation is as follows.

Winding 53 of electromagnet 52 is energized by current supplied via wires 68 and 69, causing the lowering of armature plunger 54 and, therefore, of valve stem 70 to the extreme low position shown in the drawing with the effect of closing exhaust valve 72 and of opening intake valve 71.

The air in auxiliary reservoir 22, therefore, flows through passageways 47 and 48, thence past open valve 71 and via passageway 76 to chamber 73 above the piston 74. The latter will drop, therefore, to the position shown in the drawing jointly with the spool-type valves 56 and 57.

The operation of the rest of the brake control valve device is identical to that described in FIG. 4.

The supply of compressed air to the chamber 73 for actuating piston 74 can be furnished by a source of compressed air other than the auxiliary reservoir 22, if available.

Having now described the invention, what we claim as new and desire to secure by Letters Patent is:

1. A fluid pressure responsive brake control valve device of the graduated release type comprising a first abutment having chambers on opposite sides respectively and subject to the opposing pressures therein of a fixed control pressure and of a variable control pressure, a second abutment having chambers on opposite sides, one of which is constantly open to atmosphere and to the other of which is supplied fluid at a varying pressure from a source of pressure, and valve means subject jointly to the forces on said abutments to control the supply of fluid under pressure from the source of pressure to effect a brake application to a degree according to the differential in the fixed and variable pressures acting on said first abutment, characterized by:

(a) change-over valve means having two positions, in one of which it establishes connections via which the fixed control pressure chamber associated with said first abutment and the variable pressure chamber associated with said second abtument are charged as aforesaid, and in the other one of which it disconnects the established communication for charging said fixed control pressure chamber on one side of said first abutment and establishes a new communication via which the said chamber is charged from the source of pressure, and disconnects the established communication via which the chamber on one side of said second abutment may be charged from the source of pressure and establishes a new communication via which this chamber is connected to atmosphere, whereby said graduated release valve device is conditioned to operate as a direct release valve device.

2. A brake control valve device, as claimed in claim 1, wherein said change-over valve means comprises electro-responsive valve means.

3. A brake control valve device, as claimed in claim 2, wherein the electro-responsive valve means comprises:

(a) a plurality of spool-type valves each biased to one corresponding position respectively, and
(b) a single solenoid actuator effective when energized to shift all of said valves to a second position respectively and maintain them therein so long as said solenoid continues to be energized.

4. A brake control valve device, as claimed in claim 2, further characterized in that said electro-responsive valve means comprises:

(a) a pair of spaced-apart parallel spool-type valves,
(b) spring means for biasing said pair of valves into on position respectively,
(c) a common actuator for effecting movement of said pair of spool-type valves from said one position to a second position, and
(d) an electro-responsive solenoid for exerting a force, when energized, on said actuator.

5. A brake control valve device, as claimed in claim 2, further characterized in that said electro-responsive valve means comprises:
(a) a pair of spool-type valves, biased to one position respectively,
(b) a fluid pressure operated actuator for effecting simultaneous movement of said pair of spool-type valves out of said one position to a second position, and
(c) electro-responsive pilot valve means for controlling the supply of fluid under pressure to and the release of fluid under pressure from said fluid pressure operated actuator.

6. For use in a fluid pressure brake control system having a brake pipe normally charged to a certain chosen pressure, an auxiliary reservoir normally charged to the pressure in the brake pipe, a control reservoir charged uniformly to the said certain chosen pressure in the brake pipe, and a brake cylinder device effective to cause a brake application according to the degree of pressurization thereof; a graduate release type brake control valve device comprising:
(a) a first abutment having chambers on its respective opposite sides and subject to opposing pressures therein of a fixed pressure in the control reservoir and of a variable pressure in the brake pipe,
(b) a second abutment having chambers on its respective opposite sides, one of which is constantly open to atmosphere and the other of which is subject to the pressures in the brake cylinder device,
(c) valve means subject jointly to the fluid pressure forces acting on said abutments to control the supply of fluid under pressure from the auxiliary reservoir to the brake cylinder device, to effect a brake application according to the differential in the fluid pressure forces established on said first abutment, and
(d) change-over valve means having two positions, in one of which it established communications via which fluid under pressure is supplied from the control reservoir to one chamber at one side of said first abutment, and via which said other chamber at one side of said second abutment is supplied with fluid under pressure from said brake cylinder device, and in the other of which it disconnects the established communication for charging said one chamber at said one side of said first abutment from the control reservoir and establishes a new communication via which said one chamber is charged from the auxiliary reservoir, and disconnects the established communication via which said other chamber at one side of said second abutment is supplied with fluid under pressure from said brake cylinder device and establishes a new communication via which this said other chamber is open to atmosphere, whereby said brake control valve device is conditioned to operate as a direct release type brake control valve device.

7. A brake control valve device, as claimed in claim 6, wherein said change-over valve means comprises electro-responsive valve means.

8. A brake control valve device, as claimed in claim 7, wherein said electro-responsive valve means comprises:
(a) a plurality of spool-type valves each biased to one corresponding position respectively, and
(b) a single solenoid actuator effective when energized to shift all of said valves to a second position respectively and maintain them therein so long as said solenoid continues to be energized.

9. A brake control valve device, as claimed in claim 7, wherein said electro-responsive valve means comprises:
(a) a pair of spaced-apart parallel spool-type valves,
(b) spring means for biasing said pair of valves into one position respectively,
(c) a common actuator for effecting movement of said pair of spool-type valves from said one position to a second position, and
(d) an electro-responsive solenoid for exerting a force, when energized, on said actuator.

10. A brake control valve device, as claimed in claim 7, characterized by change-over valve means comprising:
(a) a pair of spool-type valves, biased to one position respectively,
(b) a fluid pressure operated actuator for effecting simultaneous movement of said pair of spool-type valves out of said one position to a second position, and
(c) electro-responsive pilot valve means for controlling the supply of fluid under pressure to and the release of fluid under pressure from said fluid pressure operated actuator.

11. In a fluid pressure brake apparatus for a railway vehicle, in combination:
(a) a brake pipe normally charged to a certain chosen pressure to effect a brake release, a reduction from which chosen pressure initiates a brake application,
(b) a brake cylinder device to which fluid under pressure is supplied to effect a brake application and from which fluid under pressure is released to effect a brake release,
(c) an auxiliary reservoir normally charged to said certain chosen pressure in said brake pipe,
(d) a control reservoir normally charged to said certain chosen pressure in said brake pipe,
(e) a service valve device comprising:
(i) a spring-biased supply valve means for controlling the flow of fluid under pressure from said auxiliary reservoir to said brake cylinder device,
(ii) a spool-type brake cylinder exhaust valve coaxially disposed with respect to said supply valve means and provided with means to control a charging communication through which said auxiliary and control reservoirs are charged from said brake pipe,
(iii) a first abutment operatively connected to said spool-type exhaust valve subject to pressure established in said brake pipe in opposition selectively to the pressure in said auxiliary reservoir or the pressure in said control reservoir, and
(iv) a second abutment operatively connected to said spool-type exhaust valve in spaced-apart relation to said first abutment subject to atmospheric pressure in opposition selectively to the pressure in said brake cylinder device or atmospheric pressure,
(f) said service valve device being operative responsively to a reduction in the pressure in said brake pipe to move said spool-type exhaust valve to a service position in which said brake cylinder exhaust and said charging communication are closed and said supply valve means is open to effect the supply of fluid under pressure from said auxiliary reservoir to said brake cylinder device, and being responsive to a subsequent increase in the pressure in said brake pipe to move said spool-type valve to a release position to effect a release of fluid under pressure from said brake cylinder device to atmosphere and reopening of said charging communication, said spool-type exhaust valve and said supply valve means being also movable to a lap position in which fluid under pressure is trapped in said brake cylinder device, (g) an auxiliary reservoir charging check valve device, and (h) two-position selector valve means movable from a graduated release position to a direct release position and comprising:

(i) a first two-position valve that in its graduated release position establishes a first communication via which fluid under pressure flows from said brake pipe to said control reservoir and to one side of said first abutment, and in its direct release position closes said first communication and establishes a second communication between said auxiliary reservoir and said one side of said first abutment, (ii) a second two-position valve that in its graduated release position establishes a first communication via which fluid under pressure flows from said brake pipe to said auxiliary reservoir via said auxiliary reservoir charging check valve device, and in its direct release position closes said first communication and establishes a second communication via which fluid under pressure flows from said brake pipe to said auxiliary reservoir in by-pass of said auxiliary reservoir charging check valve device, and (iii) a third two-position valve that in its graduated release position establishes a first communication via which fluid under pressure flows from said brake cylinder device to one side of said second abutment, and in its direct release position closes said first communication and establishes a second communication between said one side of said second abutment and atmosphere, (i) said selector valve means while in its graduated release position conditioning said service valve device for graduated release operation, and while in its direct release position conditioning said service valve device for direct release operation, whereby in a graduated release operation said spool-type exhaust valve and said supply valve means are moved to their lap position in response to an increase in brake cylinder pressure proportional to the reduction in pressure effected in said brake pipe, and in direct release operation said spool-type exhaust valve and said supply valve means are moved to their lap position in response to a reduction in the pressure in said auxiliary reservoir equal to the reduction in pressure effected in said brake pipe.

12. A fluid pressure brake apparatus, as claimed in claim 11, further characterized by choke means disposed in said second communication established by said second two-position valve via which choke means fluid under pressure flows from said brake pipe to said auxiliary reservoir in by-pass of said charging check valve device at a restricted rate determined by the size of said choke means.

13. A fluid pressure brake apparatus, as claimed in claim 11, further characterized by spring means biasing said auxiliary reservoir charging check valve toward seated position, and by choke means disposed in said second communication established by said second two-position valve via which choke means fluid under pressure flows from said brake pipe to said auxiliary reservoir in by-pass of said charging check valve device at a restricted rate determined by the size of said choke means.

References Cited

UNITED STATES PATENTS

| | | | |
|---|---|---|---|
| 2,858,170 | 10/1958 | McClure et al. | 303—36 |
| 3,208,801 | 9/1965 | McClure | 303—36 |

DUANE A. REGER, Primary Examiner

U.S. Cl. X.R.

303—74